(12) United States Patent
Yun

(10) Patent No.: US 6,823,632 B2
(45) Date of Patent: Nov. 30, 2004

(54) APPARATUS FOR PRESERVING SUBGLASS OF DRIVING ROOM OF HEAVY EQUIPMENT

(75) Inventor: Chun Jin Yun, Changwon (KR)

(73) Assignee: Volvo Construction Equipment Holding Sweden AB (SE)

( * ) Notice: Subject to any disclaimer, the term of this patent is extended or adjusted under 35 U.S.C. 154(b) by 101 days.

(21) Appl. No.: 10/075,157

(22) Filed: Feb. 14, 2002

(65) Prior Publication Data

US 2002/0078642 A1 Jun. 27, 2002

(51) Int. Cl.[7] ............................................. E06B 3/28
(52) U.S. Cl. .................. 52/202; 52/203; 52/204.66; 52/DIG. 12; 52/204.62; 296/146.1; 296/146.16; 296/190.1; 49/141
(58) Field of Search ......................... 52/202, 204.66, 52/204.67, 716.5, 716.6, DIG. 12, 203, 208, 204.62; 70/2; 49/61, 62, 463, 141, 463.141; 296/146.1, 146.11, 146.16, 146.2, 97.1, 190.1, 152, 146.6; 16/114 R

(56) References Cited

U.S. PATENT DOCUMENTS

| | | | | |
|---|---|---|---|---|
| 3,964,779 A | * | 6/1976 | Benson | 296/26.15 |
| 3,996,710 A | * | 12/1976 | Nuss | 52/202 |
| 4,007,958 A | * | 2/1977 | Peifer et al. | 296/190.1 |
| 4,015,454 A | * | 4/1977 | Struble | 70/2 |
| 4,116,483 A | * | 9/1978 | Kramer et al. | 296/190.1 |
| 4,131,970 A | * | 1/1979 | Le Van | 16/270 |
| 4,452,011 A | * | 6/1984 | Trombettas | 49/56 |
| 4,545,606 A | * | 10/1985 | Vodra | 292/92 |
| 4,754,624 A | * | 7/1988 | Fleming et al. | 70/95 |
| 4,915,438 A | * | 4/1990 | Hashimoto et al. | 296/65.1 |
| 4,986,593 A | * | 1/1991 | Lohmann | 296/190.1 |
| 4,991,349 A | * | 2/1991 | Barthelemy | 49/61 |
| 5,127,191 A | * | 7/1992 | Ohta | 49/62 |
| 5,450,917 A | * | 9/1995 | Goddard | 180/89.12 |
| 5,603,190 A | * | 2/1997 | Sanford | 52/202 |
| 5,628,151 A | * | 5/1997 | Monat | 52/19 |
| 5,655,462 A | * | 8/1997 | Holler | 109/49.5 |
| 5,791,727 A | * | 8/1998 | Doescher et al. | 296/190.1 |
| 6,247,746 B1 | * | 6/2001 | Brush | 296/190.11 |
| 6,345,476 B1 | * | 2/2002 | Hill | 52/202 |
| 6,363,670 B1 | * | 4/2002 | Dewitt | 52/202 |
| 6,419,298 B2 | * | 7/2002 | Farrar et al. | 296/146.15 |
| 6,474,705 B1 | * | 11/2002 | Mori et al. | 292/216 |

FOREIGN PATENT DOCUMENTS

| | | | | |
|---|---|---|---|---|
| DE | 3526086 | * | 1/1987 | 52/22 |
| JP | 311061 | * | 11/1998 | 296/146.16 |
| JP | 311062 | * | 11/1998 | 296/146.1 |

* cited by examiner

*Primary Examiner*—Phi Dieu Tran A
(74) *Attorney, Agent, or Firm*—Harness, Dickey & Pierce, P.L.C.

(57) ABSTRACT

An apparatus installed in an inner side surface of an entrance door of a driving room for safely preserving a subglass when the subglass, which is detachably installed in a lower portion of a front surface of a driving room of a heavy equipment, is separated based on a working environment. The apparatus includes a lower bracket attached to a lower portion of the door, forming a mounting groove upwardly opened for inserting a lower portion of the subglass therein, and supports the subglass inserted in the mounting groove; an upper bracket installed on the upper portion of the lower bracket of the door supporting an upper portion of the inner surface of the subglass inserted in the lower bracket; and a locking apparatus installed in an upper portion of the door, which detachably supports an upper portion of the outer surface of the subglass.

3 Claims, 6 Drawing Sheets

(a)

(b)

(a)

(b)

APPARATUS FOR PRESERVING SUBGLASS OF DRIVING ROOM OF HEAVY EQUIPMENT

BACKGROUND OF THE INVENTION

1. Field of the Invention

The present invention relates to an apparatus for preserving a subglass installed in an inner side of an entrance door of a driving room of a heavy equipment. It is capable of safely preserving a subglass in a driving room in the case where a subglass, which is detachably installed in a lower portion of a front surface of a driving room of a heavy equipment, is separated based on a working environment.

2. Description of the Background Art

FIG. 1 generally shows a conventional apparatus for preserving a subglass of a driving room of a heavy equipment. In the case where a detachable subglass 100, installed in a lower portion of a front surface of a driving room 10, is separated based on a working environment, the subglass 100 is overlaid with a rear glass 11 using a locking apparatus 20, or is fixed in an inner surface of a panel (not shown) which forms the driving room 10.

In the drawings, reference numeral 12 represents a control box having a driving control adjusting lever of a heavy equipment.

In the conventional apparatus where the subglass 100 is overlaid with the rear glass 11 of the driving room 10 in order to preserve the subglass, if the heavy equipment has an accident and is inverted while preserving the subglass in the above manner, a driver of the heavy equipment must avoid an accident. In this case, since the subglass is positioned directly above the head of the driver, an external impact applied to the subglass may cause the subglass to be directly dropped onto the upper body of the driver, and the driver may be injured. Additionally, when the subglass 100 is preserved in a narrow driving room, subjected to a weight of 6~7 kg, the subglass may drop, and the driver may be injured.

Another conventional apparatus for preserving a subglass in a side of the driving room is where an inner width of a driving room complies with the ISO requirements (920 mm). In this case, a sharp corner portion of the subglass is always near the driver, which could lead to an accident. Since the subglass is positioned at a height similar to that of the head of the driver, particles of the broken subglass may critically injure the driver during an accident.

SUMMARY OF THE INVENTION

Accordingly, it is a first object of the present invention to provide an apparatus for preserving a subglass of a driving room of a heavy equipment which overcomes the problems encountered in the conventional art.

It is a second object of the present invention to provide an apparatus for preserving a subglass of a driving room of a heavy equipment, installed in a lower portion of a front surface of a driving room, separated based on a working environment, which decreases the risk of any injury if an accident occurs. This is accomplished by implementing a easy operation for attaching and detaching a subglass.

To achieve the above objects, an apparatus is provided for preserving a subglass of a driving room of a heavy equipment which includes a lower bracket, attached to a lower portion of an inner surface of an entrance door of a driving room, forming an upwardly opened mounting groove used for inserting and supporting a lower portion of the subglass; an upper bracket, attached to an upper portion of in an inner surface of the entrance door of the driving room, supporting an upper portion of the inner surface of the subglass inserted in the lower bracket; and a locking apparatus, attached to an upper portion of the inner surface of the entrance door of the driving room, which detachably supports an upper portion of the outer surface of the subglass, in close contact with the upper bracket, where said subglass is inserted in the mounting groove of the lower bracket in said apparatus.

The locking apparatus includes a fixing member attached to an inner surface of the entrance door of the driving room, a handle in which a rear end of the same is rotatably engaged to the fixing member, a support member which is protruded from an inner surface of the handle and is integrally rotated with the handle and support an outer surface of the subglass, and a handle limiting means for limiting the rotation of the handle.

The handle limiting means includes a limiting rod which has one end axially engaged with the fixing member based on a rotation and axial direction movement and the other end engaged with the handle based on an axial direction movement for thereby rotatably fixing the handle to the fixing member based on a downward rotation in a limited angular range, and a compression spring which elastically supports the limiting rod with respect to the fixing member and controls the axial direction movement of the limiting rod so that the engaging shoulder portion formed in the limiting rod is inserted in the engaging groove of the fixing member at a maximum downward rotation angle of the limiting rod.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will be explained with reference to the accompanying drawings.

Figure 1:
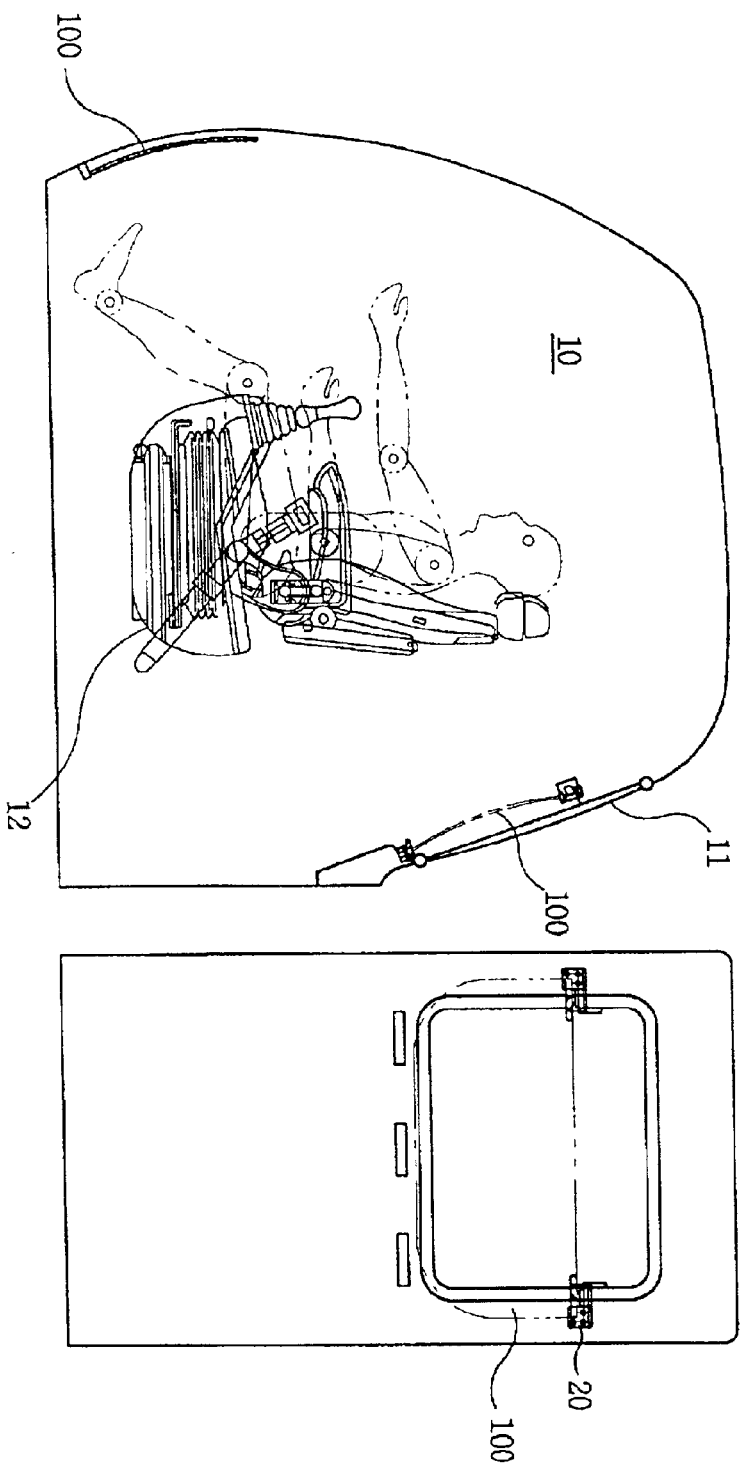
FIG. 1 is a lateral cross-sectional view and back view illustrating a driving room of a heavy equipment in which a conventional apparatus for preserving a subglass of a driving room of a heavy equipment is installed.
Figure 2:
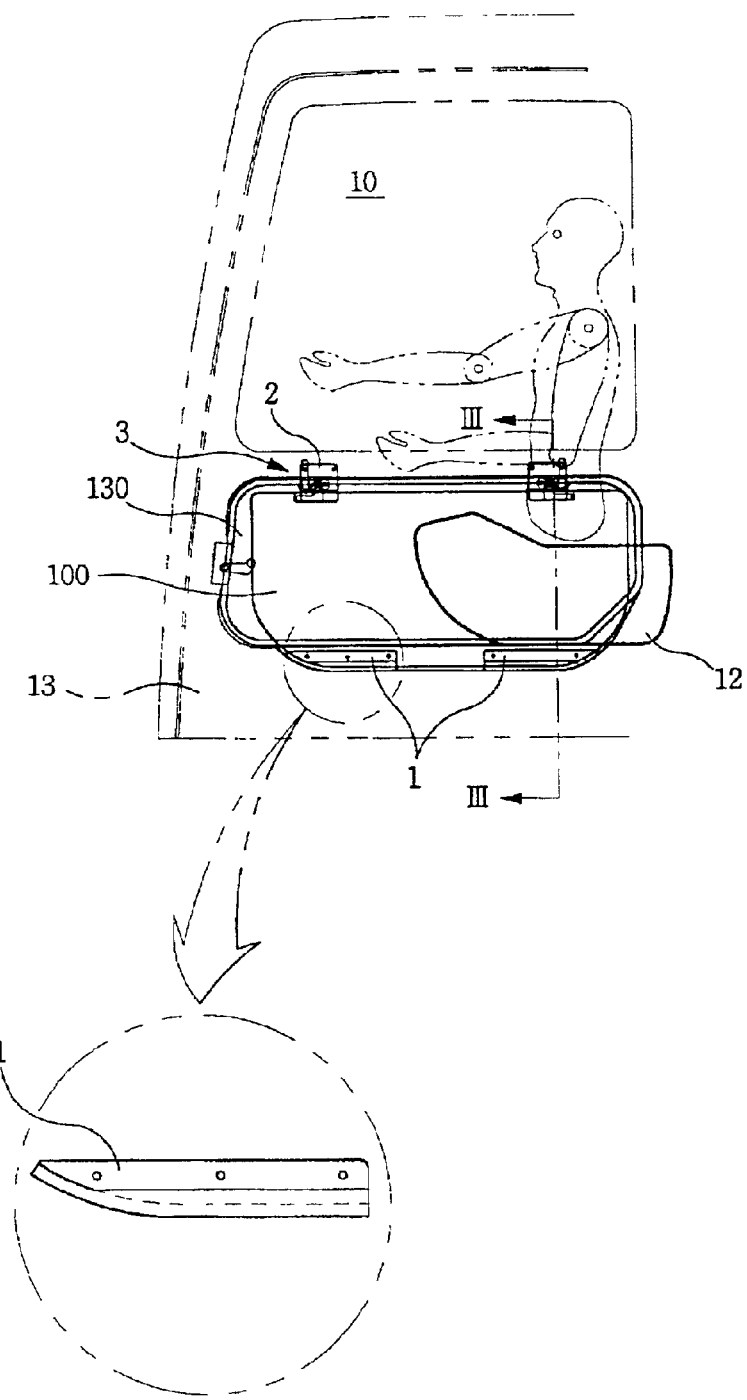
FIG. 2 is a lateral cross-sectional view illustrating a driving room of a heavy equipment in which an apparatus for preserving a subglass of a driving room of a heavy equipment according to the present invention is installed.
Figure 3:
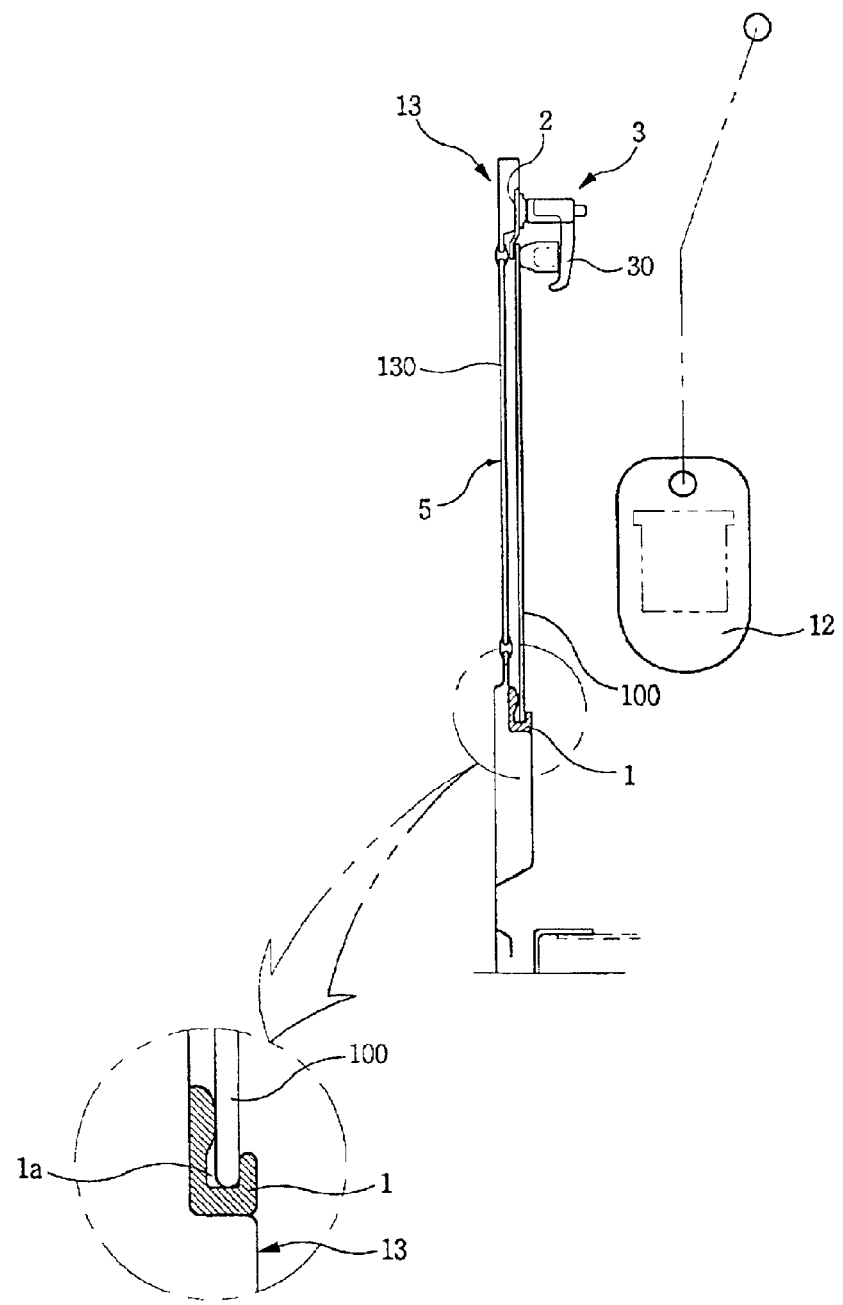
FIG. 3 is a cross-sectional view taken along line III—III of FIG. 2.

As shown in FIGS. 2 and 3, an apparatus for preserving a subglass of a driving room of a heavy equipment is constructed in such as a manner that in the case that a subglass is separated based on a working environment, the subglass is safely preserved. The apparatus for preserving a subglass of a driving room of a heavy equipment includes a lower bracket 1 which is attached to a lower portion of an inner surface of a driving room entrance room 13 and forms a mounting groove 1a which is upwardly opened, an upper bracket 2 which is installed in the upper portion of the lower bracket 1 and to which a buffering material 2a of a rubber material is attached on the surface of the same, and a locking apparatus 3 which is fixed to the driving room entrance door 13 together with the upper bracket 2 and locks and unlocks the subglass 100 inserted between the lower bracket 1 and the upper bracket 2. The upper bracket 2 is installed in a portion lower than the waist of the driver when the driver is seated to prevent the driver from being injured by the subglass 100 if an accident occurs.

Figure 4:
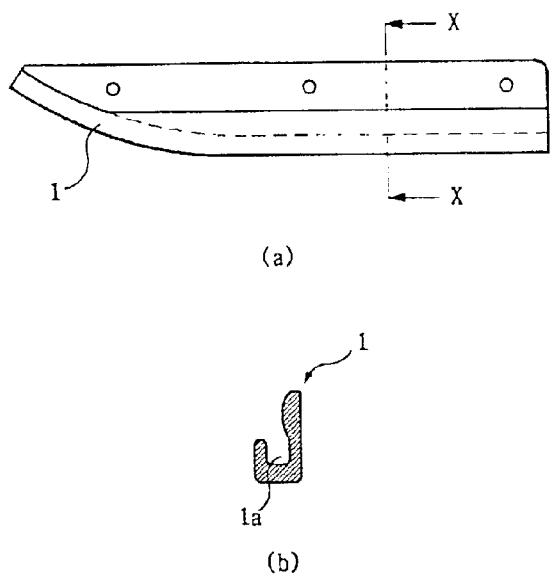
FIG. 4A is a front view illustrating a subglass of an apparatus for preserving a subglass of a driving room of a heavy equipment according to the present invention.
FIG. 4B is a cross-sectional view taken along line X—X of FIG. 4A.

As shown in FIGS. 3 and 4, the lower bracket 1 is fixedly attached to a lower portion of the inner surface of the driving room entrance door 13 and forms the mounting groove 1a which is upwardly opened and supports the lower portion of the subglass 100 inserted in the mounting groove 1a. Preferably, the lower bracket 1 is formed of a rubber material for protecting the subglass 100 from an external impact. The mounting groove 1a is formed in such a manner that a torque is applied in the outward direction with respect to the subglass 100 inserted in the mounting groove 1a.

Figure 5:
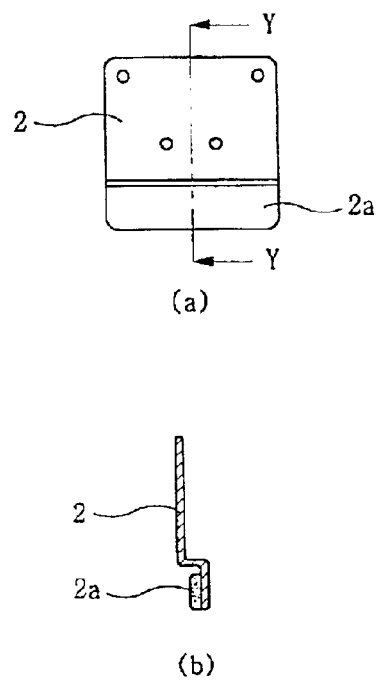
FIG. 5A is a front view illustrating an upper bracket of an apparatus for preserving a subglass of a driving room of a heavy equipment according to the present invention.
FIG. 5B is a cross-sectional view taken along line Y—Y of FIG. 5A.

As shown in FIGS. 3 and 5, the upper bracket 2 supports an upper portion of an inner surface of the subglass 100 which is inserted in the subglass 1 and is closely contacted in the direction of the driving room entrance door 12 and has a buffering material 2a formed of a rubber material for absorbing an external impact in a surface contacting with the subglass 100.

Figure 6A:
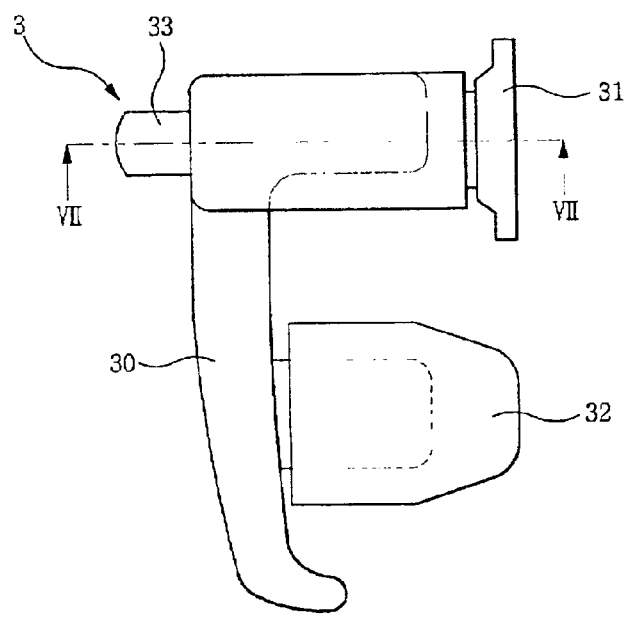
FIG. 6A is a lateral view illustrating a: locking apparatus of an apparatus for preserving a subglass of a driving room of a heavy equipment according to the present invention.
Figure 6B:
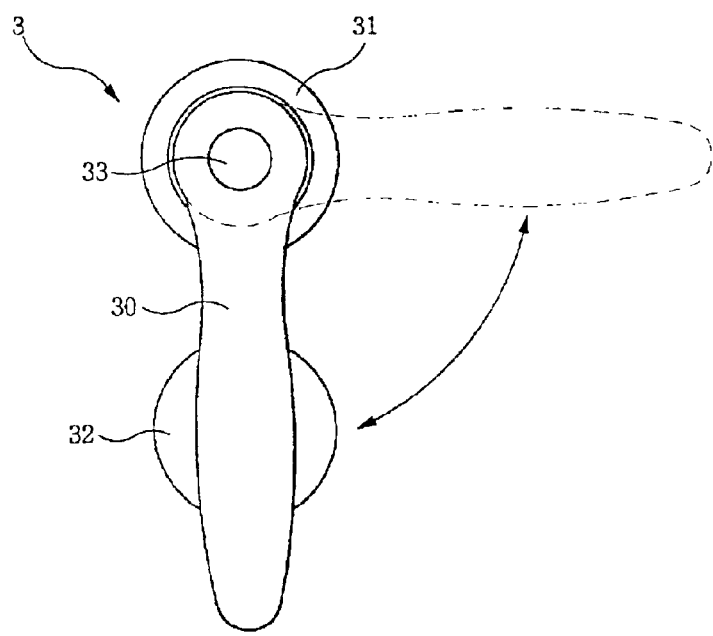
FIG. 6B is a view illustrating an operation of an apparatus for preserving a subglass of a driving room of a heavy equipment according to the present invention.

As shown in FIG. 3, the locking apparatus 3 contacts with the surface of the upper bracket 2 and is fixed to the entrance door 13 together with the upper bracket 2. As shown in FIGS. 6A and 6B, the locking apparatus 3 includes a fixing member 31 attached to an inner surface of the entrance door 13 together with the upper bracket 2, a handle 30 which is installed in the fixing member 31 and rotatable in a limited angular range, a limiting member for selectively limiting the rotation of the handle 30, and a support member 32 which is protruded from an inner surface of the handle 30 and directly supports an upper portion of the outer surface of the subglass 100 and is formed of an elastic material.

Figure 7A:
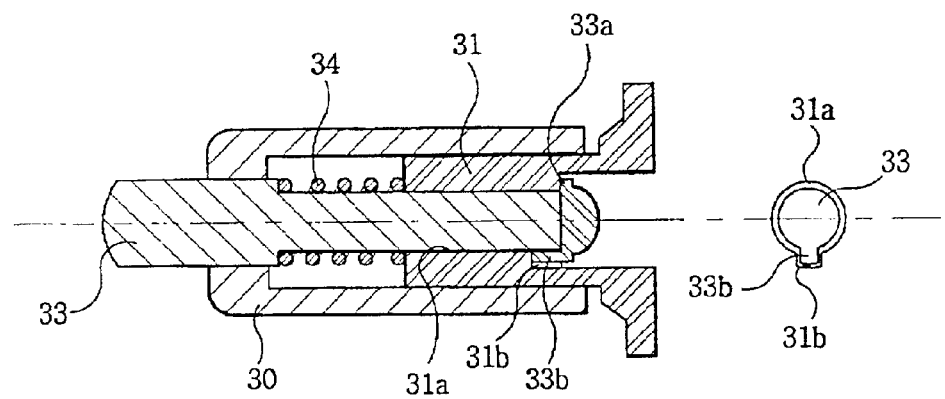
FIG. 7A is a lateral cross-sectional view which illustrates a handle locking state of an apparatus for preserving a subglass of a driving room of a heavy equipment according to the present invention and which is taken along line VII—VII of FIG. 6A and is a back view of the same.
Figure 7B:
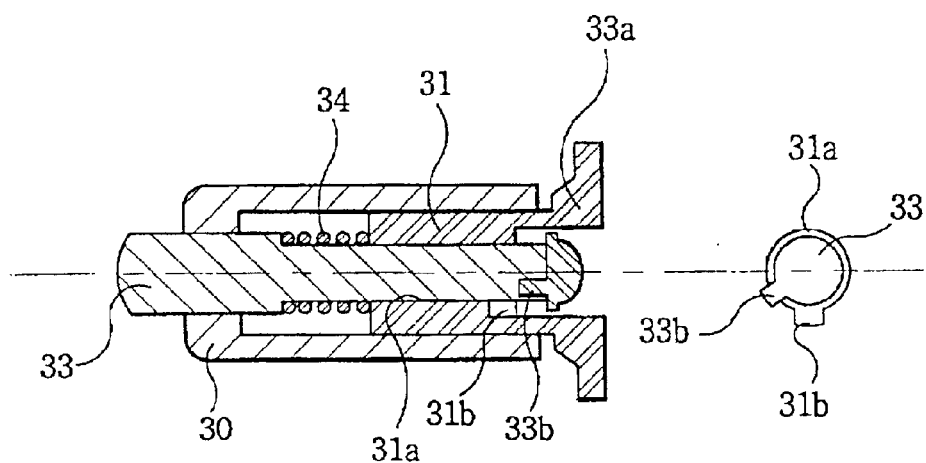
FIG. 7B is a lateral cross-sectional view which illustrates a handle unlocking state of an apparatus for preserving a subglass of a driving room of a heavy equipment according to the present invention and which is taken along line VII—VII of FIG. 6A.

As shown in FIGS. 7A and 7B, the handle limiting member includes a limiting rod 33 which is inserted in a through hole 31a formed in the center of the fixing member 31 and rotatably engages the handle 30 engaged to the end portion of the same to the fixing member 31, and a compression spring 34 which elastically supports the limiting rod 33 with respect to the fixing member 31.

An escape prevention shoulder portion 33a is installed in a rear end of the limiting rod 33 for preventing an escape of the limiting rod 33. An engaging shoulder portion 33b is protruded in an axial direction and is formed in one side of the escape prevention shoulder portion 33a. In addition, an engaging groove 31b which has the same phase as the engaging shoulder portion 33b at a maximum downward rotation angle of the limiting rod 33 is formed in the fixing member 31.

In the handle limiting members 31b, 33, 34 and 33b, in the case that the handle 30 is downwardly rotated in maximum, namely, in the case that the support member 32 which is rotated together with the handle 30 supports an outer surface of the subglass 100 inserted in the lower bracket 1, as shown in FIG. 7A, the engaging shoulder portion 33b of the limiting rod 33 rotated together with the handle 30 and the engaging groove 31b of the fixing member 31 are same. Therefore, the driving rod 33 is moved in an axial direction by an elastic force of the compression spring 34, and the engaging shoulder portion 33b of the limiting rod 33 is inserted into the engaging groove 31b of the fixing member 31 for thereby limiting the limiting rod 33 with respect to the fixing member 31, so that the handle 30 is not rotated.

In the thusly constituted apparatus for preserving a subglass of a driving room of a heavy equipment according to the present invention, the subglass 100 separated from the lower portion of the front surface of the driving room of the heavy equipment is engaged or disengaged in the inner surface of the driving room entrance door 13 in the following method.

In the case that the subglass 100 is separated and fixed to the driving room entrance door 13 using the apparatus for preserving the subglass 100 of the driving room of the equipment according to the present invention, first, in a state that the handle 30 is upwardly rotated in maximum, the subglass 100 is inserted into the lower bracket 1 and is pushed in the direction of the entrance door 1, so that an upper portion of the inner surface of the subglass 100 is closely contacted with the buffering material 2a of the upper bracket 2, and the subglass 100 is temporarily fixed between the lower bracket 1 and the upper bracket 2. In this state, when the handle 30 is downwardly rotated in maximum, the front end of the support member 32 which is rotated together with the handle 30 is closely contacted with the upper portion of the outer surface of the subglass 100 for thereby supporting the upper portion of the subglass 100. Therefore, the subglass 100 inserted between the upper and lower brackets is not escaped using the support member 32 of the handle 30. At this time, in the handle limiting members 31b, 33, 34 and 33b, as the engaging shoulder portion 33b of the limiting rod 33 which is rotated at the maximum downward rotation angle together with the handle 30 and the engaging groove 31b formed in the fixing member 30 have the same phase, the limiting rod 33 is moved in the axial direction in the outward direction by an elastic force of the compression spring 34. As shown in FIG. 7a, the engaging shoulder portion 33b is inserted into the engaging groove 31b of the fixing member 31 and is not rotated in a state that the limiting rod 33, namely, the handle 30 is limited by the fixing member 31, and the support member 32 supports the subglass 100.

On the contrary, when disengaging the subglass 100 fixed to the apparatus for preserving a subglass of a driving room of a heavy equipment, first, the front end of the limiting rod 33 which is outwardly protruded is pushed using a thumb by holding the handle 30, so that the engaging shoulder portion 33b of the limiting rod 33 is escaped from the engaging groove 31b of the fixing member 31 as shown in FIG. 7B. In a state that the front end of the limiting rod 33 is pressed, namely, in a state that the limiting rod 33 is in a free rotation state, when the subglass 100 is upwardly rotated along the dotted line of FIG. 6B for escaping the handle 30 from the subglass 100, the support member 32 is escaped from the subglass 100 together with the handle 30 for thereby implementing a unlocking state with respect to the subglass 100. The subglass 100 which is simply inserted in the subglass 1 and is in a detachable state is lifted for thereby being escaped from the entrance door 13.

As described above, in the apparatus for preserving a subglass of a driving room of a heavy equipment according to the present invention, since it is possible to preserve a subglass of a front surface of a driving room which is separated based on a working environment is a lower portion of an inner surface of an entrance door lower than the working position of a driver, it is possible to improve a stability by decreasing a damage due to a subglass when an accident occurs. In addition, since an apparatus for preserving a subglass of a driving room of a heavy equipment according to the present invention is installed in an inner surface of the entrance door, in a state that the entrance door is opened, it is possible to engage and disengage the subglass in an outdoor, and it is possible to implement an easier locking operation and is possible to easily disengage the subglass.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An apparatus for temporarily preserving a subglass of an entrance door of a driving room of a heavy equipment, said apparatus comprising:
   a subglass;
   a lower bracket adapted to be attached to a lower portion of an inner surface of said entrance door of a driving room, said lower bracket having a mounting groove therein which is upwardly opened for receiving a lower portion of the subglass therein thereby supporting the lower portion of the subglass inserted in the mounting groove;
   an upper bracket adapted to be attached to an upper portion of an inner surface of said entrance door of the driving room said upper bracket supporting an upper portion of the inner surface of the subglass; and
   a locking apparatus adapted to be attached to an upper portion of the inner surface of said entrance door of the driving room detachably supports an upper portion of the outer surface of the subglass in close contact with the upper bracket so that the subglass can be removed from the upper and lower bracket;
   wherein said locking apparatus includes:
   a fixing member adapted to be attached to an inner surface of said entrance door of the driving room;
   a handle in which an upper end of the same is rotatably engaged to the fixing member, a lower end of the handle being space from and generally parallel to the subglass;
   a support member which is protruded from an inner surface of the handle and is integrally rotated with the handle and supports an outer surface of the subglass; and
   a handle limiting means for limiting the rotation of the handle.

2. The apparatus of claim 1, wherein said handle limiting means includes:
   a limiting rod which has one end axially engaged with the fixing member based on a rotation and axial direction movement and the other end engaged with the handle based on an axial direction movement for thereby rotatably fixing the handle to the fixing member based on a downward rotation in a limited angular range;
   a compression spring which elastically supports the limiting rod with respect to the fixing member and controls the axial direction movement of the limiting rod so that the engaging shoulder portion formed in the-limiting rod is inserted in the engaging groove of the fixing member at a maximum downward rotation angle of the limiting rod;
   an escape prevention shoulder portion installed in a rear end of said limiting rod;
   an engaging shoulder portion protruded in an axial direction, formed in one side of said escape prevention shoulder portion; and
   an engaging groove having the same phase as said engaging shoulder portion at a maximum downward rotation angle of said limiting rod.

3. An apparatus for temporarily preserving a subglass of an entrance door of a driving room of a heavy equipment, said apparatus comprising:
   a subglass;
   a lower bracket adapted to be attached to a lower portion of an inner surface of said entrance door of a driving room, said lower bracket having a mounting groove therein which is upwardly opened for receiving a lower portion of the subglass therein thereby supporting the lower portion of the subglass inserted in the mounting groove;
   an upper bracket adapted to be attached to an upper portion of an inner surface of said entrance door of the driving room, said upper bracket supporting an upper portion of the inner surface of the subglass; and
   a locking apparatus adapted to be attached to an upper portion of the inner surface of said entrance door of the driving room that detachably supports an upper portion of the outer surface of the subglass in close contact with the upper bracket so that the subglass can be removed from the upper and lower brackets;
   wherein said locking apparatus includes:
   a fixing member adapted to be attached to an inner surface of said entrance door of the driving room;
   an elongated handle in which an upper end of the same is rotatably engaged to the fixing member, a lower end of the handle being space from and generally parallel to the subglass;
   a support member affixed to and protruding from an inner surface of the handle towards the subglass, the support member pressing the subglass against the upper bracket when the handle is in a first position to hold the subglass in the upper and lower brackets, with the support member being disengaged from the subglass when the handle is rotated to a second position to thereby allow the subglass to be removed from the upper and lower brackets to permit escape from the driving; and
   a handle limiting means for limiting the rotation of the handle.

* * * * *